United States Patent

[11] 3,568,107

[72] Inventor Ronald D. Haggarty
Wayland, Mass.
[21] Appl. No. 856,413
[22] Filed Sept. 9, 1969
[45] Patented Mar. 2, 1971
[73] Assignee the United States of America as represented by the Secretary of the Air Force

[54] METHOD AND APPARATUS FOR EFFECTING TAPPED DELAY LINE SYNTHESIS OF LARGE TIME BANDWIDTH FILTERS
7 Claims, 25 Drawing Figs.

[52] U.S. Cl. .......... 333/70, 333/29
[51] Int. Cl. .......... H03h 7/10, H03h 7/38
[50] Field of Search .......... 333/18, 28, 29, 70, 70T

[56] References Cited
UNITED STATES PATENTS

| | | | |
|---|---|---|---|
| 3,026,475 | 3/1962 | Applebaum .......... | 333/70(T)X |
| 3,054,073 | 9/1962 | Powers .......... | 333/70(T) |
| 3,315,171 | 4/1967 | Becker .......... | 333/70(T) |
| 3,445,771 | 5/1969 | Clapham .......... | 333/18X |
| 3,508,172 | 4/1970 | Kretzmer .......... | 333/18 |

*Primary Examiner*—Herman Karl Saalbach
*Assistant Examiner*—T. Vezeau
*Attorneys*—Harry A. Herbert, Jr. and Willard R. Matthews, Jr.

ABSTRACT: The present invention comprehends a method and apparatus for the design of large time bandwidth product linear filters by tapped delay line filter synthesis techniques. A periodic transfer function is selected which has a linear time delay characteristic and an amplitude versus frequency characteristic which, in combination with like transfer functions in proper phase relationship produces a filter with a constant resultant amplitude versus frequency characteristic and a linear time delay characteristic. A plurality of sequences of pulses are generated by a tapped delay line. The number of pulses in each sequence is equal to the number of Fourier harmonics of the selected periodic transfer function. They are weighted with appropriate Fourier coefficients and are combined to form a plurality of synthesized periodic transfer functions that conform to the selected transfer function. The synthesized periodic transfer functions are divided into constituent components defined by various frequency bands (or periods). The constituent components are relatively delayed and recombined to effect the composite filter having an extremely large time bandwidth product.

INVENTOR.
RONALD D. HAGGARTY
BY Harry A. Herbert Jr. and
Willard R. Matthews Jr.
ATTORNEYS

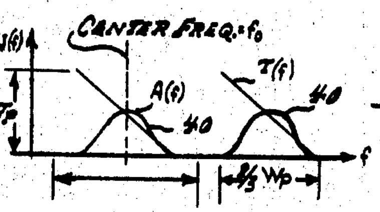
FIG.7
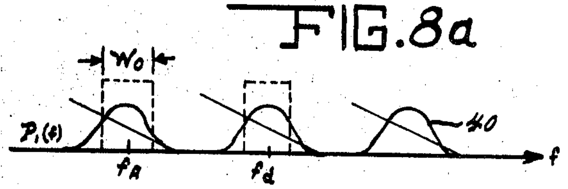
FIG.8a
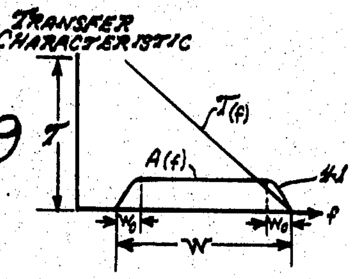
FIG.9
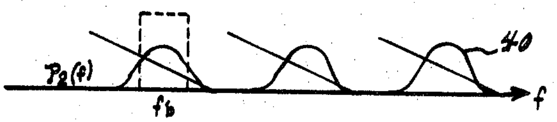
FIG.8b
FIG.8c
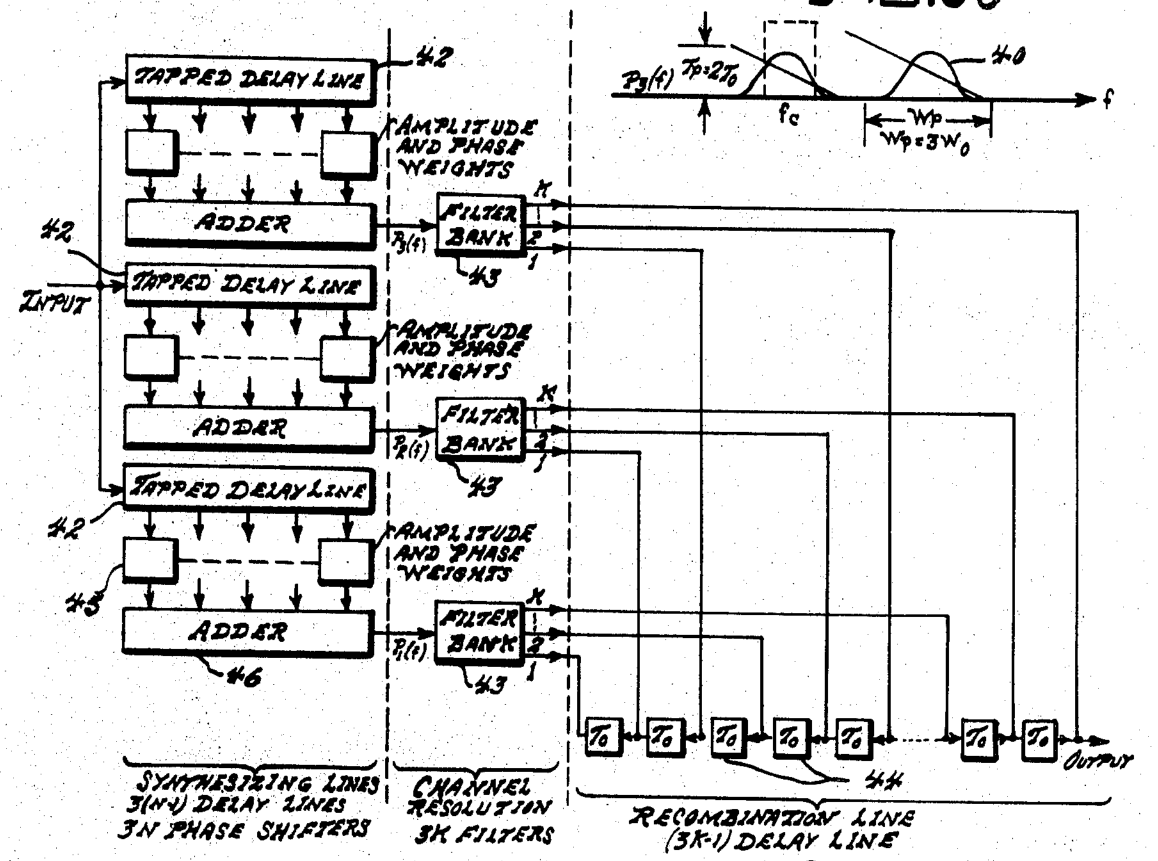
FIG.10
RONALD D. HAGGARTY
BY Harry A. Herbert Jr and
Willard R. Matthews
ATTORNEYS INVENTOR.
RONALD D. HAGGARTY
BY Harry A. Herbert Jr. and Willard R. Matthews
ATTORNEYS INVENTOR.
RONALD D HAGGARTY
BY Harry A. Herbert Jr and
Willard R. Matthews Jr
ATTORNEYS

METHOD AND APPARATUS FOR EFFECTING TAPPED DELAY LINE SYNTHESIS OF LARGE TIME BANDWIDTH FILTERS

BACKGROUND OF THE INVENTION

This invention relates to large time bandwidth product linear time invariant filters of the type used in pulse compression systems, and more particularly to tapped nondispersive delay line filters capable of synthesizing a constant amplitude, linear time delay transfer functions of arbitrary time bandwidth products.

Large time bandwidth product linear filters (hereinafter referred to as *TW* linear filters) have applications in many fields, e.g., communications, radar, and data recording. The filters are, or can be, used to analyze simple signals, to generate and receive and process extremely complex signals, and to code and decode signals in order to protect against corruption by unwanted signals, noise, and equipment error.

Specifically, they can serve as real time spectrum analyzers to perform single pulse doppler measurements on received radar signals, to instantaneously determine channel availability and frequency location in multiple-user, multiple-channel communication systems, and to determine the frequency locations of jammers in hostile radar and communication environments. The number of resolution cells in such spectrum analyzers is equivalent to the *TW* product of the filter employed.

Large *TW* filters are used in radar pulse-compression systems to generate and receive complicated signals. The filter's linear time-invariant properties permit such pulse-compression systems to operate in search radar environments (where no a priori target information is available), to process multiple radar targets in real time, and even to process the outputs of multiple radar receivers in real time. The pulse-compression ratio of such system is the *TW* product of the linear filer involved. The ability of the associated radar to make accurate estimates of target parameters is directly related to the *TW* product. In addition to accuracy, the performance of the radar under adverse conditions (clutter) and in hostile environments (jamming) improves with increasing *TW*.

Large *TW* filters can code and decode signals for secure communication systems and for protection against impulse noise in both communications and data recording systems. In record and playback systems, the dispersive characteristics of large *TW* filters protect against short-time destruction and loss of data due to equipment errors such as tape imperfections or dead spots.

Nearly every aspect of system performance in all of the applications discussed above improves as the time bandwidth product of the linear filter increases. Simultaneously, the problems of filter complexity (number of components) and component tolerance rapidly become more difficult. It is difficult to obtain a *TW* product of even a few hundred with conventional lumped constant filters.

The present invention comprehends procedures through which large *TW* linear filters can be synthesized with a relatively small number of components. The reduction in complexity is made possible by using a device that has an inherently large time delay bandwidth product, viz, the nondispersive quartz delay line. Since system performance is strongly related to errors caused by unavoidable component variations (deviations from ideal design values), relatively simple systems of the type herein disclosed depending primarily upon a small number of stable, accurate, nondispersive quartz delay lines will exhibit very high-quality characteristics, thereby gaining all the system's theoretical capability.

SUMMARY OF THE INVENTION

The method and apparatus described herein is based upon a Fourier synthesis procedure whereby arbitrary amplitude and phase functions are synthesized.

Nearly every aspect of pulse-compression system performance improves as time-bandwidth-product increases. Simultaneously, the problems of system complexity and component tolerance rapidity become more difficult. Using conventional lumped-constant filters, exceptional effort is required to obtain a *TW* product of several hundred. This invention provides a method of linearly generating and receiving large *TW* product signals by tapped delay linear filter synthesis techniques. Special emphasis is placed on equipment simplicity and ease of implementation. The essential elements employed by the technique are quartz delay lines, band-pass filters, band-pass phase shifters and resistive weighting networks. The technique does not make use of many elements which are found in most conventional pulse compression systems. In particular, dispersive networks, frequency synthesizers, and precision band-pass filters are not required. Consequently, the total number of components is small, even for *TW* products of a few thousand, thereby making it feasible to obtain good peak-signal to "hash" sidelobe levels at the matched receiver output.

It is a principal object of the invention to provide a novel method of synthesizing large time bandwidth filters by tapped delay line filter synthesis techniques.

It is another object of the invention to provide new and improved large time bandwidth signal filter means capable of *TW* products of $10^3$ and higher.

It is another object of the invention to provide new and improved large time bandwidth signal filter means that are adaptive to radar pulse compression systems and which have linear time-invariant properties which permit such a pulse compression system to operate in search radar environments.

It is another object of the invention to provide a new and improved large time bandwidth signal filter means that is adapted to combination with a coherent linear frequency modulated oscillator to effect a real time spectrum analyzer.

It is another object of the invention to provide a new and improved large time bandwidth signal filter means that are adapted to code and decode signals for secure communications systems.

It is another object of the invention to provide a new and improved large time bandwidth signal filter means that is adapted to protect against impulse noise in both communications and data recording systems.

These, together with other advantages and features of the invention, will become more apparent from the following detailed description taken in conjunction with the illustrative embodiments in the accompanying drawings where in like elements are given like reference numerals throughout.

Figure 4:
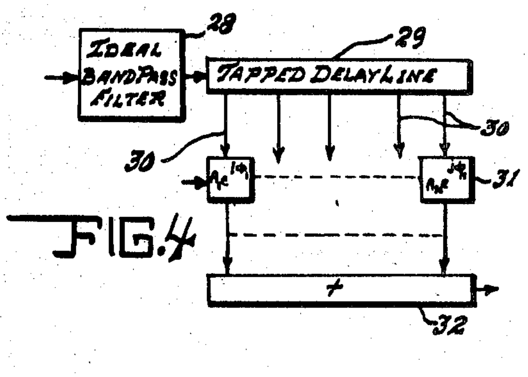
Figure 5B:
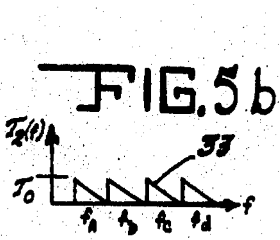
Figure 5A:
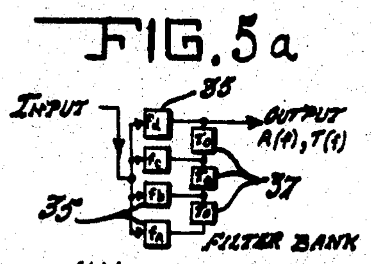
Figure 5C:
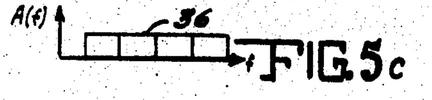
Figure 5D:
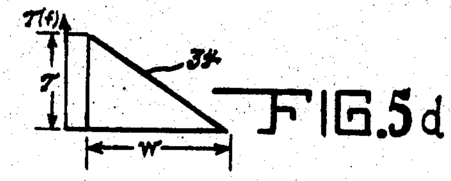
Figures 6A, 6B, 6C, 6D:
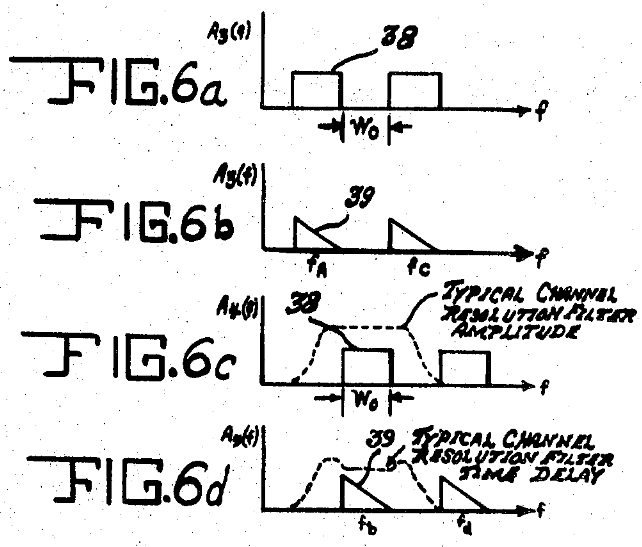
Figure 12:
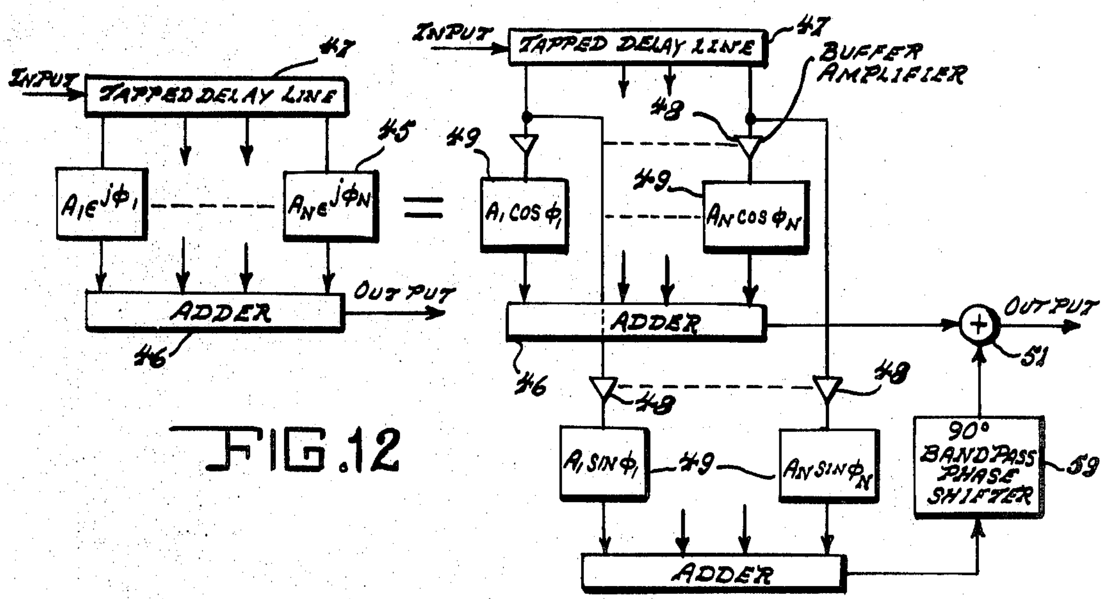
Figure 11:
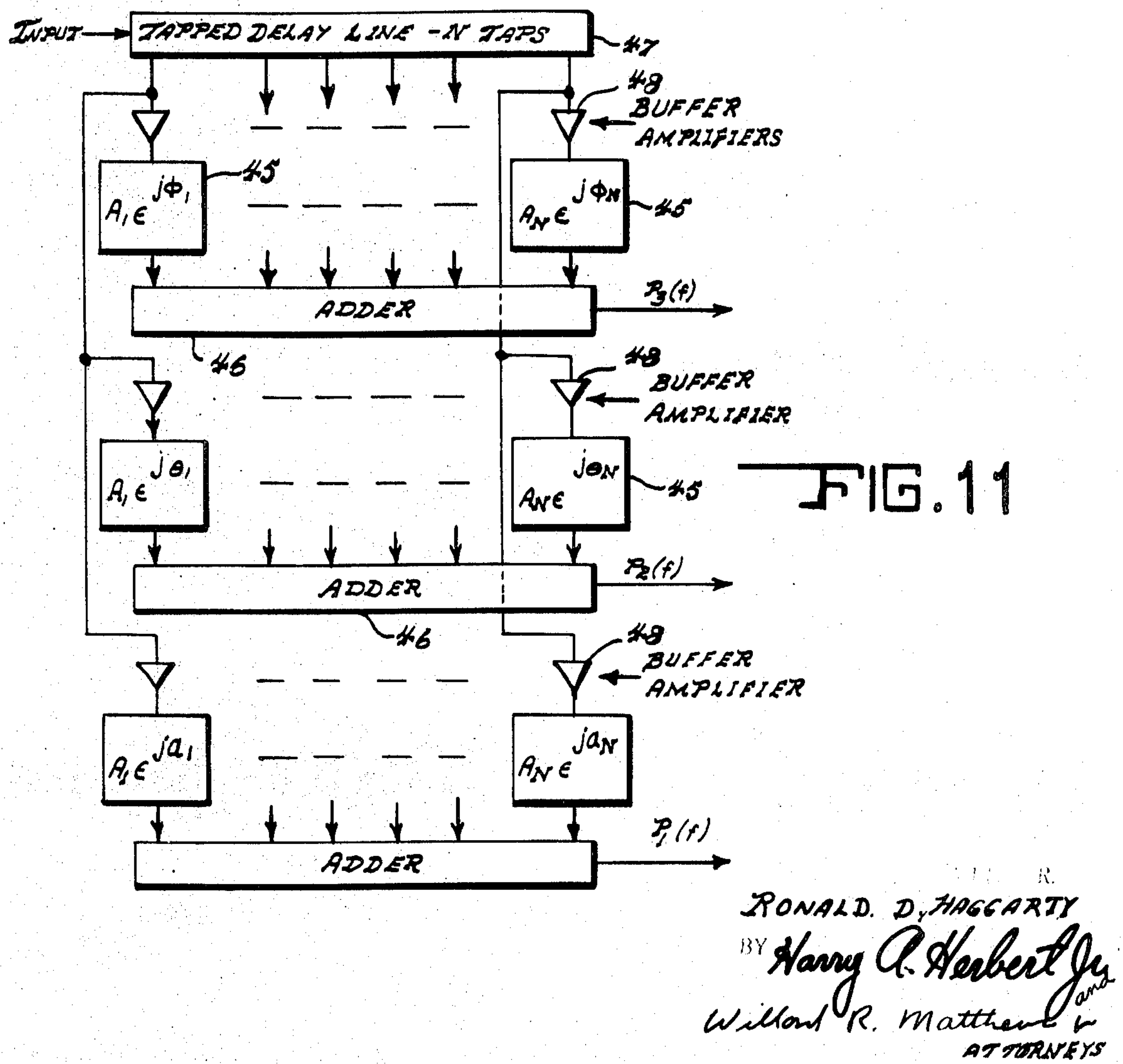
Figure 13:
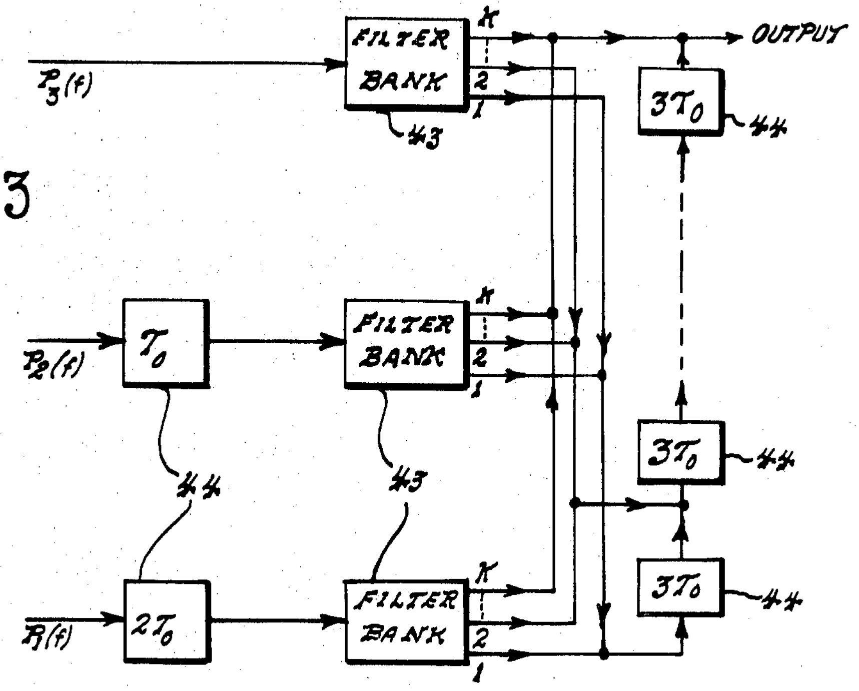
Figure 14:
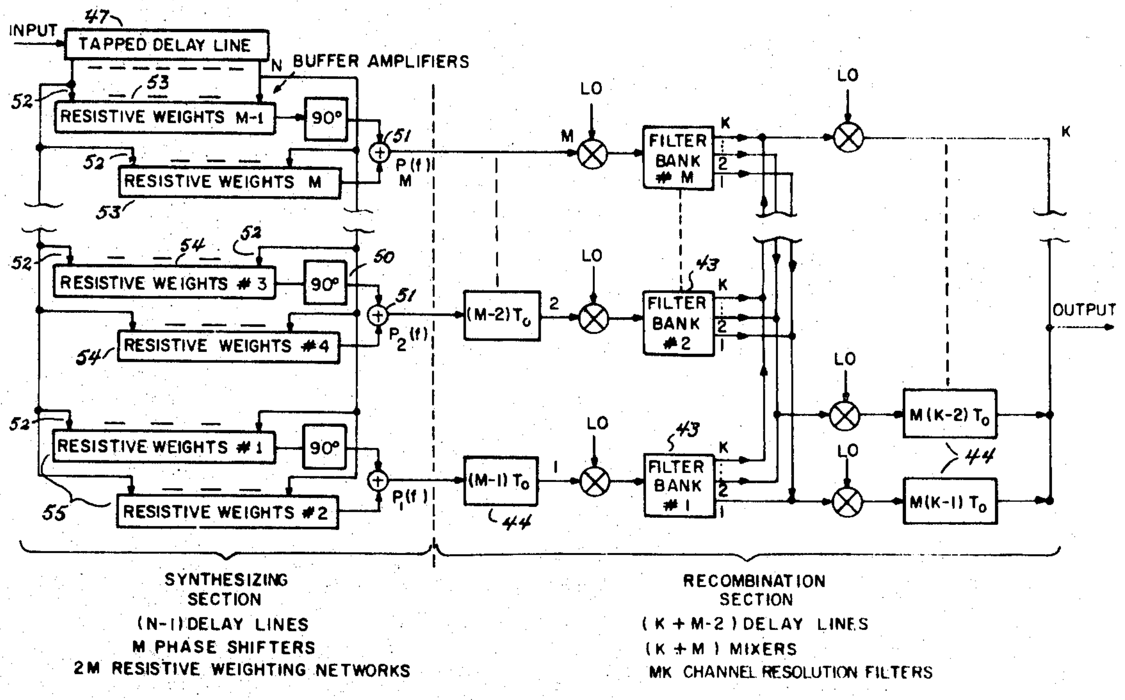

1(f);

FIG. 4 is a block diagram illustrating means for obtaining the function $T_2(f)$;

FIGS. 5*a*, 5*b*, 5*c*, and 5*d* illustrate, in block diagram form, a channel resolution filter section and recombination delay line together with the constituent and recombined transfer functions generated thereby;

FIGS. 6*a*, 6*b*, 6*c*, and 6*d* illustrate waveforms generated by multiple banks of band-pass channel resolution filters;

FIG. 7 illustrates a wave form of a preferred periodic transfer function as comprehended by the invention;

FIGS. 8*a*, 8*b*, and 8*c* illustrate transfer functions of the type shown in FIG. 7 as input to multiple banks of channel resolution filters;

FIG. 9 illustrates a transfer function representing the combined transfer function of FIGS. 8*a*, 8*b*, and 8*c*;

FIG. 10 is a block diagram of means for generating and recombining the periodic functions of FIGS. 8*a*, 8*b*, and 8*c*;

FIGS 11, 12, and 13 are block diagrams illustrating alternative approaches to various functions of the means of FIG. 10; and FIG. 14 is a block diagram of a generalized large *TW* product tapped delay line filter embodying the principles of the invention. (FIG. 12 MTR-14)

DESCRIPTION OF THE PREFERRED EMBODIMENT

In the following description of the invention the problem of generating a large *TW* product signal will be considered to be equivalent to the problem of synthesizing a filter with a specified transfer function. A method of synthesis is discussed by an example wherein a filter with a constant amplitude and linear time delay transfer function of arbitrary *TW* product is synthesized. The specialization this particular class of transfer function does not result in a loss of generality. The method may be applied to the problem of synthesizing any arbitrary transfer function.

Figure 1A:
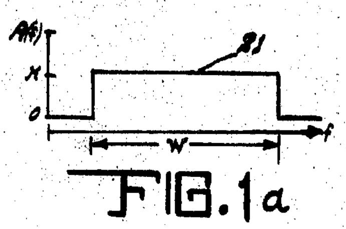
FIGS. 1*a* and 1*b* illustrate the amplitude and time delay characteristics respectively of a discrete transfer function to be synthesized in accordance with the principles of the invention.
Figure 1B:
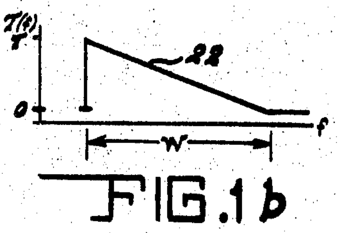

The problem to be considered is the synthesis of a linear filter which has the transfer function shown in FIGS. 1*a* and 1*b*. The amplitude characteristic 21 is constant over the band of frequencies *W* c.p.s. the group time delay characteristic 22 is linear over the band *W* and dispersive by an amount *T* seconds. The time bandwidth product of this function is defined as *TW*.

Figures 2A, 2B, 2C:
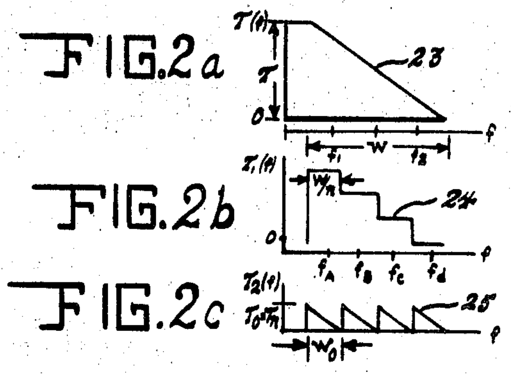
FIGS. 2*a*, 2*b*, and 2*c* illustrate a desired transfer function $T(f)$ and its two constituent amplitude and time functions $T_1(f)$ and $T_2(f)$.

The first step in the procedure is to resolve the desired function *T*(f) into the two functions $T_1$ and $T_2$(f) as shown by curves 23, 24, and 25 respectively in FIGS. 2*a*, 2*b*, and 2*c*. The band *W* is divided into *n* equal intervals $$W_o=\frac{W}{n}\text{cps} \quad (1)$$

each interval has $$T_o=\frac{T}{n}$$

seconds of dispersion. Then the total *TW* product is $$TW=n^2T_oW_o. \quad (3)$$

Figure 3:
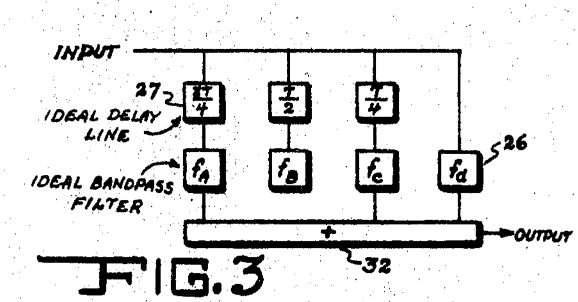
FIG. 3 is a block diagram illustrating means for obtaining the function *T*

The function $T_1$(f) can, in principle, be obtained from a tapped delay line which has an appropriate ideal band-pass filter on each tap as illustrated in FIG. 3. This arrangement of filters 26, summing means 32 and delay lines 27 produces the n taps from *n*-1 lines.

The problem which remains to be solved in synthesizing the desired function *T*(f), is the generation of the sawtooth type of time delay characteristic *T*2(f). This function is periodic in the band *W* with a period of $W_o$ and it has $T_o$ seconds of dispersion in each period.

A band limited signal can be obtained from the cascade of an ideal band-pass filter 28 and a tapped delay line 29 as illustrated in FIG. 4. The delay line shown has equally spaced taps 30, and amplitude and phase weights 31 in each tap. The complex impulse response of this system is $s_c$(t) t) and is summed by summing means 32.

$$s_o(t)=B\sum_{k=1}^{N}A_k\frac{\sin\pi B(t-k\tau)}{\pi B(t-k\tau)}\,j[\omega_o(t-k\tau)+\varphi_k] \quad (4)$$

Where: *B* is the bandwidth of the ideal filter in cps, $\omega_o$ is the filter radian center frequency and $\tau$ is the delay line tap spacing. The positive frequency portion of the transfer function of this system is $S_c(\omega)$, the Fourier transform of $s_c$(t).

$$S_o(\omega)=\int_{-\infty}^{\infty}s_o(t)\epsilon^{-i\omega t}dt,$$

$$S_o(\omega)=\sum_{k=1}^{N}a_k\epsilon^{i\varphi k}\epsilon^{-i\omega k\tau},\ \text{for}\ (\omega_o-\pi B)\leq\ \leq(\omega_o+\pi B) \quad (5)$$

$$S_o(\omega)=0\ \text{elsewhere.}$$

$S_c(\omega)$ is a band-pass function with its band determined by the ideal filter. $S_c(\omega)$ is a periodic function of frequency in the band of frequencies *B*, with a period given by the reciprocal of the tap spacing, $$\text{period}=\frac{1}{\tau}.$$

However, the question remains, how many taps are necessary to produce $T_2$(f), the function of interest? The right-hand side of equation 5 is complex Fourier series expansion of $S_c(\omega$ ) in the band of frequencies *B*. Then for the case $$S_c(\omega)=T_2(f)$$

the necessary number of taps is identical to the number of Fourier coefficients in the expansion of $T_2$(f).

The right-hand side of equation 5 can be obtained without error by choosing the tapped delay line amplitude weight $A_k$ and the phase weight $6_k$ so that they are equal to the magnitude and angle of the $k^{th}$ Fourier series complex coefficient. The number of taps required in such a synthesis process is identical to the number of Fourier coefficients which the desired function contains. It should be noted that $S_c(f)$ is the complex transfer function of the filter and thus includes both an amplitude and a phase characteristic.

In general, it is not necessary to exactly synthesize a desired function, but only to approximate it within a certain error bound. Consequently, if the function can be well represented by only a small number of terms of its Fourier series expansion, then it can be synthesized by a small number of delay lines. Since a truncated Fourier series expansion is employed, the synthesized function will be a least means square approximation to the desired function. This property is particularly important in radar pulse compression applications since it implies that the rms range sidelobes (error of hash sidelobes) will be minimized and that multiple object or clutter performance will be correspondingly optimized.

It should be noted that a time waveform can be synthesized in an analogous manner simply by replacing *t* in equation (4) with *f* and *f* in equation (5) with *t*.

Since both of the time delay functions $T_1$(f) and $T_2$(f) can be obtained from tapped delay lines, it follows that the desired function *T*(f) can be obtained from the cascade of these two delay lines. In the following description, the delay line which generates the function $T_2$(f) will be called the synthesizing delay line and the line which generates $T_1$(f) will be called the recombination delay line.

The manner in which the recombination delay line converts the function $T_2$(f) (illustrated by curve 33) into the total desired function *T*(f) (illustrated by curve 34) is illustrated in FIGS. 5*a* through 5*d*. The function *T*2(f) is the input to a filter bank which contains as many filters 35 as there are periods of *T*2(f) in the band *W*. In the illustration of FIGS. 5*a* through 5*d* there are four. All are ideal band-pass filters centered at the frequencies $f_a$, $f_b$, $f_c$, and $f_d$as shown, with bandwidths $W_o$. The output of each filter versus frequency is a function with a rectangular amplitude, as shown by curve 36 and a linear time delay. The time function which appears at the output of each of these filters will be referred to as a surplus and the filters will be called channel resolution filters.

Each subpulse has a time bandwidth product $T_o$ $W_O$. The subpulse with the highest center frequency $f_d$ is not delayed, but goes directly to the output of the system. The pulse centered at $f_c$ is delayed by an amount $T_o$ and added to the first output pulse. The remaining pulses are differentially delayed by $T_o$ and added in turn. The sum of these subpulses is an overall pulse whose spectrum amplitude versus frequency $A$(f) f) and time delay 101 spectrum amplitude versus frequency $A(f)$ and time delay versus frequency $T(f)$ are shown by curve 34 of FIG. 5*d*.

In addition to the tapped recombination delay line, a bank of ideal channel resolution filters is required. However, it is possible to replace this bank of ideal filters with two (or more) banks of nonideal band-pass filters by requiring not one input periodic function but two (or more) periodic functions as illustrated by curve 38 and 39 in FIGS. 6*a* through 6*d*. These functions are periodic in both amplitude, $A$(f), and time delay, $T$(f), in the band $W$. As a consequence, the channel resolution filters need only be flat in a band $W_o$ centered at a frequency, say $f_a$, and have the desired amount of rejection outside of a band $3W_o$. The combined result still produces the desired subpulses at the output of the nonideal channel resolution filters and these subpulses can be recombined in a manner identical to the one demonstrated in FIG. 5*d*.

It is thus necessary to generate two periodic transfer functions. Furthermore, each synthesizing delay line must accommodate enough Fourier series coefficients to well represent a periodic function of the type shown in FIG. 6*a*. The amplitude is unity for half of each period and is zero for the remaining half period. The time delay is linear for that part of each period where the amplitude is nonzero. Clearly, such a function will not be well represented by a small number of terms. Such a compromise can easily be accommodated in the recombination process, for it merely means that the subpulses will overlap in frequency. Thus, the problem is finally reduced to the finding of a periodic function whose amplitude goes slowly to zero in such a manner that two adjacent subpulses add to unity in their overlap band, and whose time delay is linear when the amplitude is nonzero. A function which meets all of these requirements is shown as curve 40 in FIG. 7. The amplitude characteristic $A$(f) f)of this function is defined as $$A(f)=\begin{cases}0 & ,\ \text{for}-\frac{1}{2}\leq\frac{f-f_o}{W_p}\leq\frac{1}{3}\\ 1+\cos 3\pi\frac{(f-f_o)}{W_o}, & \text{for}-\frac{1}{3}\leq\frac{f-f_o}{W_p}\leq\frac{1}{3}\\ 0 & ,\ \text{for}-\frac{1}{3}<\frac{f-f_o}{W_p}<\frac{1}{2}\end{cases}\qquad(6)$$

The time delay characteristic is $$T(f)=\begin{cases}\text{Undefined}\\ \frac{T_p}{2}\left[1-3\frac{(f-f_o)}{W_p}\right], \text{ same as above.}\\ \text{Undefined}\end{cases}$$

The time delay need only be controlled over that portion of the period where the amplitude is nonzero. Therefore, $T_p$ need only be $$T_p=2T_o$$

as shown by curve 40 in FIG. 8. However, due to the zero amplitude region in each period, the period $W_p$ must be $$W_p=3W_o.$$

The use of this particular function makes it necessary to generate a minimum* of three periodic functions and to use three separate banks of channel resolution filters. The three periodic functions are shifted in frequency with respect to each other by $W_o$ c.p.s. as illustrated in FIGS. 8*a* through 8*c*. That is, the center frequencies to two adjacent subpulses differ by $$W_o=\frac{W_P}{3}\text{cps.}$$

This shift assures that only two subpulses overlap in any given region. The shape of the subpulses 40 is such that they add to a constant in the overlap region. This process of addition can be seen from FIGS. 8*a* through 8*c* and may be demonstrated in the following manner. Neglect phase terms, that is, assume the subpulses have been properly delayed so that they have the same time delay curves in the overlap frequency region. Then let $$|P_1(f)|=1+\cos 3\frac{(f-f_A)}{W_P},\ \text{for } f_A\leq f\leq\left(f_A+\frac{W_P}{3}\right)$$

and $$|P_2(f)|=1+\cos 3\frac{(f-f_B)}{W_P},\ \text{for }\left(f_B-\frac{W_P}{3}\right)\leq f\leq f_B$$

where:

$$f_B=f_A+\frac{W_P}{3}$$

so that $$|P_2(f)|=1-\cos 3\frac{(f-f_A)}{W_P},\ \text{for }\left(f_A\leq f\leq\left(f_A+\frac{W_P}{3}\right)\right.$$

In like manner $$|P_3(f)|=0\ \text{for } f_A\leq f\leq\left(f_A+\frac{W_P}{3}\right)$$

Similar conditions apply in all other regions of the frequency which are in the band of interest. Then the sum of these adjacent channels gives, $$|P_1(f)+P_2(f)+P_3(f)|=2,\ \text{for } f_A\leq f\leq f_A+\frac{W_P}{3}.$$

If $K$ periods of each of the $M$ such periodic functions are used, then $MK$ subpulses are obtained. The overall pulse bandwidth is defined as that frequency band over which the total time delay is linear, as shown in FIGS. 1*a* and 10 and the system transfer function 41 of FIG. 9.

Consequently, the band $W$ is given by $$W=\left(K+\frac{1}{M}\right)W_P$$
$$=(MK+1)\frac{W_P}{3}$$
$$=(MK+1)W_o$$

Combining this result with equation (1) shows that $n$ and $K$ are related by $$n=MK+1$$

Substitution of equations (7) and (8) into equation (1) yields, $$TW=n^2\frac{T_PW_P}{2M}.$$

Combining this result with equation (5) gives, $$TW=(MK+1)^2\frac{T_PW_P}{2M}$$

Equation (10) relates the overall $TW$ product and the $TW$ product of one period of the periodic transfer function defined in equation (6) when $K$ periods of the function are employed.

*Note that if $M$ functions are synthesized, $M$ banks of channel resolution filters are required. Also the "3" in equation (6) and (8) and in FIG. 7 must be replaced by the value $M$. $M$ channels can be used in the general system.

The manner in which the 3$K$ subpulses ($M$=3) are generated and recombined is illustrated in FIG. 10. Three ($M$) tapped delay lines 42 together with weighting means 45 and adder means 46 are used to obtain the three ($M$) periodic transfer functions $P1Cf)$, $P2(f)$, and $P3(f)$ Each filter bank 43 contains $K$ channel resolution filters. The subpulses at the output of the channel resolution filters are recombined through delay lines 44 in a manner identical to that discussed previously. The overall transfer function 41 is shown in FIG. 9. The group delay characteristic varies linearly by $T$ seconds over the band $W$. The amplitude is flat over the band except for a region of $W_0$ c.p.s. at each end, where it falls off as the amplitude of a single channel.

Considerable reduction of the complexity of the system shown in FIG. 10 is possible. The system shown contains three separate synthesizing tapped delay lines, each of which contain $N$ taps, giving a total of 3($N$—1) delay lines. However, the three synthesizing lines have transfer functions which differ only by a frequency shift. Consequently, the three synthesizing lines are identical except for the phase weights on their taps (i.e., the tap spacing and the amplitude weights are the same). Thus, the three tapped delay lines may be replaced by one tapped delay line 47 with the three buffer amplifiers 48 on each tap, thereby saving 2($n$—1) delay lines, as illustrated in FIG. 11.

Of course, it is still necessary to construct three separate sets of weighting networks. But, it is not necessary to construct a band pass phase shifter for each tap weight. The complex weighting network can be replaced by two real quadrature weighting networks 49, a band-pass 90° phase shifter 50, and additional adder means 51. This equivalence is illustrated in FIG. 12.

Further, simplification of the system illustrated in FIG. 10 is possible. The recombination tapped delay line is made up of (3$K$—1) delay lines 44. The arrangement shown in FIG. 13 performs the recombination of the subpulses with only $K$+1 delay lines, a saving of 2($K$—1) delay lines.

The reduced version of the total generalized system is illustrated in FIG. 14. The outputs of the taps on the taps on the one synthesizing tapped delay line 47 are buffered by amplifier 52 so that $M$ different periodic functions can be obtained from one tapped line and $M$ weighting networks 53, 54, 55. Each weighting network consists of two sets of real weights and one 90° band-pass phase shifter 50. All except one of the resulting periodic functions are delayed. All enter their separate banks of channel resolution filters. Because of the delay lines prior to the channel resolution filters 43 the subpulses can be added in sets of $M$. These sets of $M$ pulses are then recombined in a manner identical to that discussed previously. The overall transfer function of the entire system is shown in FIG. 9. The group delay characteristic varies linearly by $T$ seconds over the band $W$. The amplitude is flat except for a region of $W_0$ c.p.s. at each end of the band, where it falls off as the amplitude of a single channel.

It will be understood that various changes in the detailed materials and arrangements of parts and steps which have been herein described and illustrated in order to explain the nature of the invention may be made by those skilled in the art with the principles and scope of the invention as expressed in the appended claims.

I claim:

1. The method of synthesizing large time bandwidth product filters by means of tapped delay line filter synthesis comprising the steps of:
 - selecting a discrete periodic transfer function, said transfer function having an amplitude characteristic that is a complete cycle of (1 + cosine) function over a portion of said period, a minimal amplitude over the remaining portion of the period, a characteristic effective to produce a constant resultant amplitude when combined with an identical function that has been properly frequency shifted and added in proper phase relationship, and a linear time delay characteristic;
 - generating by a tapped delay line, at least three sequences of pulses, each said sequence having a number of pulses equal to the number of Fourier harmonics that constitute said transfer functions;
 - weighting said pulses with the Fourier phase and amplitude coefficients characteristic of said transfer function;
 - summing said weighted pulses in appropriate order and time sequence to synthesize at least three of said transfer function;
 - dividing each said synthesized transfer function into constituent components defined by various frequency bands;
 - effecting relative delays of said constituent components; and
 - recombining said delayed constituent components so as to achieve the total transfer function of the large time-bandwidth product filter.

2. The method of synthesizing large time bandwidth product filters defined in claim 1 wherein said discrete periodic transfer function amplitude is 1 + cosine $M\pi$ $$\frac{(f-f_o)}{W_D}$$

and the time delay is $$\frac{T_D}{2}\left[1-M\frac{(f-f_o)}{W_D}\right]$$

in the nonzero amplitude part of each period ($W_p$ = period). The nonzero part of said period being $$-\frac{1}{M}\leq\frac{f-f_o}{W_D}\leq\frac{1}{M}$$

amplitude—linear time delay filter.

3. A large time bandwidth product signal filter comprising means for generating from one input pulse of plurality of sequences of pulses in response to each said input function, each said sequence having a number of pulses equal to the number of Fourier harmonics in a discrete periodic transfer function, means for weighting the pulses in each said sequence with the Fourier phase and amplitude coefficients characteristic of said transfer function, means for summing said weighted pulses in appropriate order and time sequence to synthesize a plurality of said transfer functions, means for dividing each said synthesized transfer function into constituent components defined by various frequency bands, means for effecting relative delays of said constituent components, and means for recombining said delayed constituent components such that the resultant signal is the pulse response of the desired large time bandwidth product —constant amplitude —linear time delay filter.

4. A large time bandwidth product filter as defined in claim 3 wherein said means for generating a sequence of pulses comprises nondispersive delay line having a plurality of equally spaced taps.

5. A large time bandwidth product filter as defined in claim 4 wherein said means for weighting pulses comprises a complex resistive weighting network.

6. A large time bandwidth product filter as defined in claim 2 wherein said discrete periodic transfer function has a complete cycle within a given period, minimal amplitude over a portion of said period, a characteristic effective to produce a constant resultant amplitude when combined with an identical function in proper phase relationship, and a linear time delay characteristic.

7. A large time bandwidth product generator as defined in claim 2 wherein said discrete periodic transfer function amplitude is 1 + cos $M\pi$ $$\frac{(f-f_o)}{W_D}$$

within $$\frac{-1}{M}\leq\frac{f-f_o}{W_D}\leq\frac{1}{M}$$

portion of each period and minimal over the remaining portions of said period ($W_p$).